March 9, 1948.  L. K. HEDDING  2,437,322
ELECTRICAL RECTIFIER
Filed July 11, 1945  2 Sheets-Sheet 1
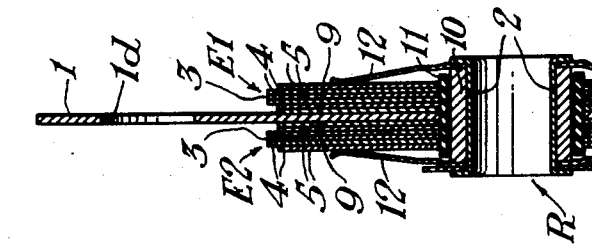
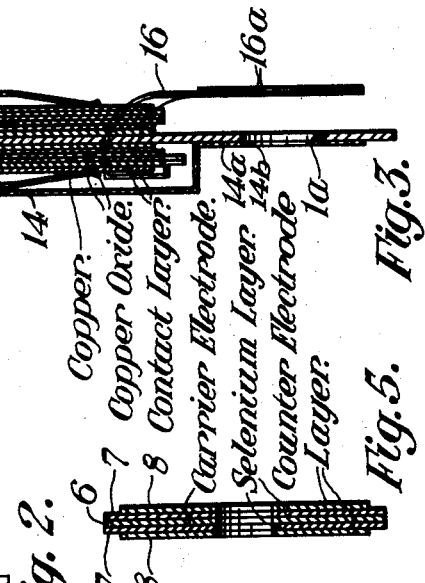
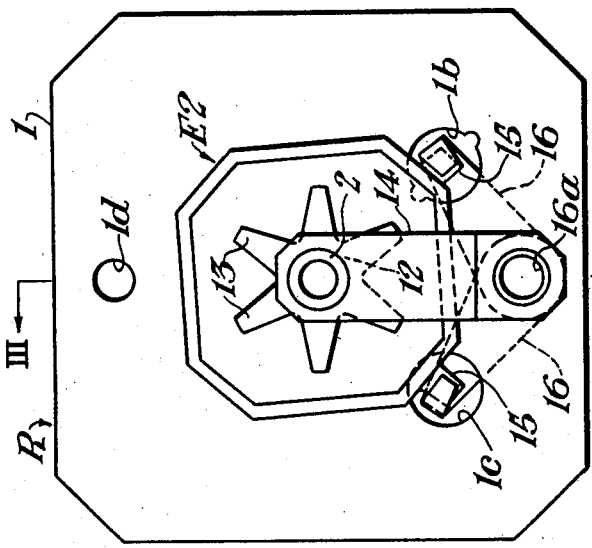
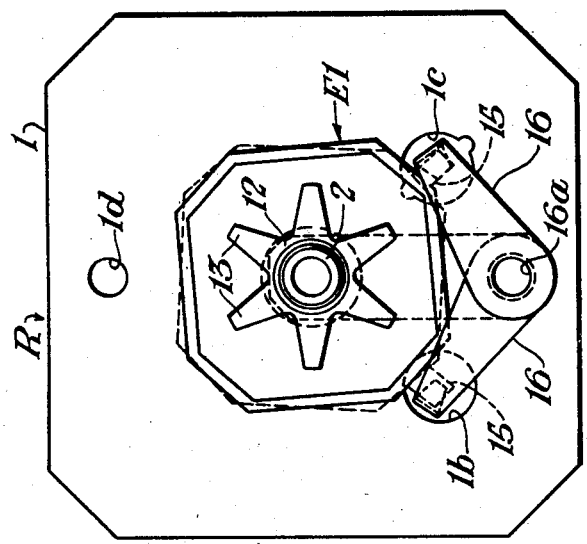
INVENTOR.
Linnie K. Hedding.
BY
HIS ATTORNEY March 9, 1948.　　　L. K. HEDDING　　　2,437,322
ELECTRICAL RECTIFIER
Filed July 11, 1945　　　2 Sheets-Sheet 2
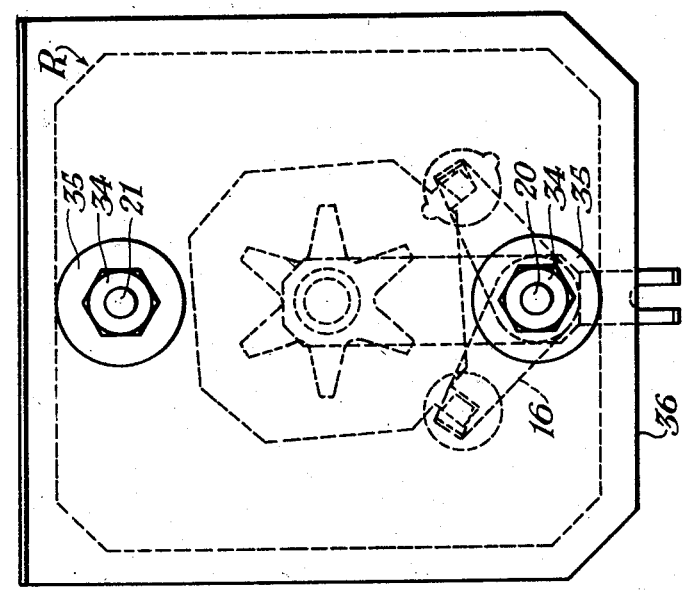
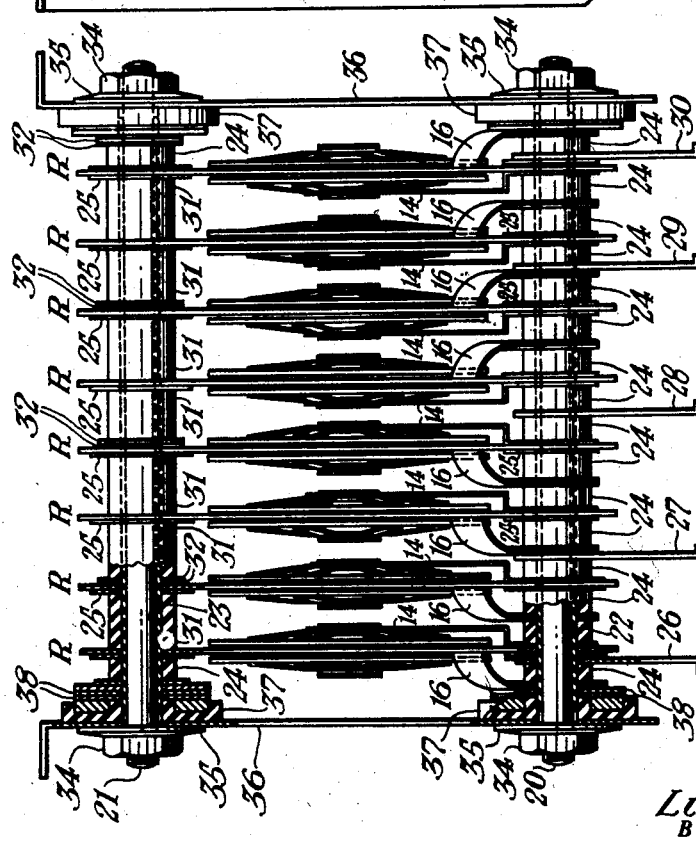
INVENTOR.
Linnie K. Hedding.
BY
HIS ATTORNEY Patented Mar. 9, 1948

2,437,322

UNITED STATES PATENT OFFICE 2,437,322

ELECTRICAL RECTIFIER

Linnie K. Hedding, Wilkinsburg, Pa., assignor to The Union Switch & Signal Company, Swissvale, Pa., a corporation of Pennsylvania Application July 11, 1945, Serial No. 604,372

4 Claims. (Cl. 175—366)

My invention relates to electrical rectifiers, and particularly to electrical rectifiers of the so-called dry surface contact type, such as the well known copper oxide and selenium rectifiers.

In manufacturing rectifiers of the type described it is common practice to employ discs or plates of a standard size, and to connect the required number of such discs or plates in series and parallel with each other in a stack to provide the required output voltage and current. In order to use the full area of the plates to advantage it is sometimes necessary to provide cooling vanes for transferring the heat generated within the plates to the surrounding atmosphere. A rectifier stack containing these parts must, therefore, provide for good heat transfer from plate to vane, and also permit a free circulation of air through the assembly. In cases where both sides of the plates are utilized for rectification, a means must also be provided for collecting current from each side.

One object of my invention is to provide a novel method and structure for prefabricating a pair of rectifier elements, a cooling vane, suitable contact members and suitable connectors into a unit rectifier which is easy to manufacture and which possesses the desired heat dissipating properties.

Another object of my invention is to provide a unit rectifier of such construction that a number of such unit rectifiers may readily be assembled into a stack or column on a supporting stud or studs with suitable spacers and insulating washers with the positive connectors facing in either or both directions in the stack, whereby any desired output voltage and current may readily be obtained.

According to the preferred form of my invention, I clamp two rectifier elements, each of which is provided on each side of the element with a contact surface separated from the base plate of the element by a rectifying junction, to the opposite sides of a cooling vane by means of a rivet which is insulated from the elements and the vane, and I interpose between the inner contact surface of each element and the vane a contact washer which serves the triple purpose of providing good heat transfer between the elements and the vane, establishing electrical contact between the inner faces of the elements and the vane, and insuring that the base metal of the elements does not come into contact with the vane. I also interpose between the outer contact surface of the one element and one end of the rivet a spring contact member and a negative connector, and between the outer contact surfaces of the other element and the other end of the rivet another spring contact member. The negative connector is adapted to be clamped at its free end against the vane and serves to connect the outer contact surfaces of both rectifier elements to the vane, whereby all four contact surfaces of the elements are electrically connected to the cooling vane. The base plate of each element is provided with a projecting lug to which a positive connector is fastened. The free ends of the positive connectors are spaced from the elements, and are provided with a through hole for the reception of a mounting stud for supporting in a stack the resulting rectifier unit formed by the elements, the vane and the contact members, which through holes align with a hole in the vane and in the negative connector. Another through hole is provided in each cooling vane for the reception of a second mounting stud. The parts are so proportioned that the units can be assembled on the studs into a stack with the connectors facing in either or both directions, in the stack, whereby the desired output voltage and current rating can readily be obtained.

Other objects and characteristic features of my invention will become apparent as the description proceeds.

I shall describe two forms of rectifier units embodying my invention and a rectifier stack employing these units, and shall then point out the novel features thereof in claims.

In the accompanying drawings, Figs. 1 and 2 are opposite side views showing one form of rectifier unit embodying my invention. Fig. 3 is an enlarged sectional view taken substantially on the line III—III of Fig. 2. Fig. 4 is a side view showing another type of rectifier element which may be employed in the rectifier unit shown in Figs. 1, 2 and 3 in place of the elements there illustrated. Fig. 5 is a vertical sectional view of the element shown in Fig. 4. Figs. 6 and 7 are fragmentary enlarged sectional views showing modifications of the rectifier units illustrated in the preceding views. Fig. 8 is a side elevational view with some of the parts in section showing a rectifier stack employing rectifier units of the type described in the preceding views. Fig. 9 is an end view of the stack shown in Fig. 8.

Similar reference characters refer to similar parts in each of the several views.

Referring first to Figs. 1 to 3, inclusive, the rectifier unit here shown is designated as a whole by the reference character R, and comprises two rectifier elements E1 and E2 clamped to the opposite sides of a cooling vane 1 by means of a hollow rivet 2 passing through aligned centrally located holes provided in the elements and in the vane. As illustrated, the elements E1 and E2 are of the well-known copper oxide type, and each comprises a copper base plate 3, provided on each side with a layer 4 of copper oxide, the central area of the outer surface of which is coated with a metal contact layer or layers 5. As is well understood, elements of the type described exhibit the characteristic of offering a lower resistance to current which flows from the oxide to the copper than to current which tends to flow in the opposite direction through the element.

It should be particularly pointed out that while in the unit as illustrated the elements E1 and E2 are of the copper oxide type, insofar as my present invention is concerned, these elements might equally well be of the selenium type shown in Figs. 4 and 5. Referring to Figs. 4 and 5, the element here shown comprises a metal plate 6 provided on both sides with a layer 7 of selenium the central region of which is coated with a contact layer 8 of suitable metal such as a tin cadmium alloy. It is obvious that both types of elements are similar to the extent that each element of either type includes a carrier electrode provided on each side with a contact layer separated from the carrier electrode by a rectifying junction, and it should be distinctly understood that insofar as my present invention is concerned it is immaterial which type of element is employed in the rectifier unit R.

Each of the rectifier elements E1 and E2 is separated from the cooling vane 1 by a metal contact washer 9 of impressionable conducting material such as lead, and the washers 9, the elements E1 and E2 and the cooling vane 1 are all spaced from the rivet 2 by a metal bushing 10 and an insulating bushing 11. The contact washers 9 serve the triple purpose of providing good heat transfer from the rectifier elements to the vane, establishing good electrical contact between the vane and the inner contact layer of the elements, and insuring that the inner and outer edges of the base plates of the elements where the base metal might be exposed do not come into contact with the vane to thereby short circuit the unit assembly. If desired, the metal bushing 10 and insulating bushing 11 may be omitted, and an insulating bushing 11a which is thicker than the insulating bushing 11 may be substituted therefore as shown in Fig. 6.

The rectifier unit also comprises two spring contact members 12 which are mounted on the rivet 2 at the outer ends of the bushings 10 and 11, and which are each provided with a plurality of radially extending fingers 13 having curved outer ends which bear against, and make electrical contact with, the outer contact layer of the adjacent element. Also mounted on the one end of the unit outside of the adjacent spring contact member is a connector 14, the free end 14a of which is offset inwardly to a position in which it lies flat against the adjacent side of the cooling vane 1. Formed in the end 14a of the connector 14 is a hole 14b which aligns with a hole 1a in the cooling vane 1 for the reception of a mounting stud or bolt, as will be explained more fully hereinafter. The negative connector 14, the spring contact members 12, and the rivet 2 together constitute means for connecting the outer contact layers of the elements to the cooling vane, and it will be obvious, therefore, that both the inner and outer contact layers of both rectifier elements are electrically connected to the vane.

The base metal of each element is provided with a laterally projecting lug 15 which in the case of a copper oxide rectifier element constitutes the positive terminal of the element, and secured in any convenient manner as by soldering to this lug of each element is a positive connector 16. In the case of a selenium rectifier element the lug would constitute the negative terminal of the element. In order to facilitate the assembly of the unit into a stack in the manner to be explained presently, it is desirable that both positive connectors have their free ends disposed on the same side of the unit a predetermined distance from the cooling vane opposite the hole 1a in the vane, and to this end the cooling vane is provided with a hole 1b through which the one connector extends to the opposite side of the vane from that on which it is connected to the associated lug 15. A hole 1c is also provided in the cooling vane opposite the other lug to increase the electrical clearance between the lug and the plate. Formed in the outer end of each connector is a hole 16a which aligns with the hole 1a in the vane and the hole 14b in the negative connector. The cooling vane is further provided with still another hole 1d for the reception of a mounting stud or bolt as will be made clear presently.

With the unit constructed in the manner just described, the unit in and of itself constitutes a half wave rectifier, the negative terminal of which is the cooling vane and the positive terminal of which comprises the two positive connectors 16. The unit as a whole is held together by peening over the ends of the rivet into engagement with the one contact washer 12 and the negative connector 14, and constitutes a readily handled assembly of relatively rigid construction.

If desired, the metal rivet 2 and metal bushing 10 may be combined into a metal bushing 10a constructed as shown in Fig. 7. Referring to Fig. 7, it will be noted that the bushing 10a is provided at each end with a portion which is adapted to be bent into engagement with the one metal contact member and the negative connector in place of the usual rivet flange so that the bushing performs the combined function previously performed by the separate rivet and bushing.

Referring now to Figs. 8 and 9, I have here shown a plurality of rectifier units R each of which may be similar to the rectifier unit R just described stacked on two bolts 20 and 21. The particular stack illustrated constitutes a full wave rectifier and comprises four legs or sections A, B, C and D, each consisting of two rectifier units in series. The units of the two legs A and B are assembled on the bolts 20 and 21 with their positive connectors 16 facing toward the left, while the units of the two remaining legs or sections are assembled on the bolts with their positive connectors 16 facing in the opposite direction. The bolts 20 and 21 pass through the holes 1a and 1d in the vane 1 with considerable clearance, and are insulated from the vane by means of insulating tubes 22 and 23 which surround the bolts. The bolt 20 and associated tube 22 also pass through the opening 14b in the negative connector 14 of each unit and the openings 16a in the positive connectors 16 of each unit, and mounted on the tube 22 between adjacent units are two similar metallic spacers 24 which serve to space the positive connectors of each unit from the associated vane and from the negative connector of the next adjacent unit. To prevent the units from becoming short circuited by the spacer 24 which is disposed between the positive connector of each unit and the vane of the same unit, an insulating washer 25 is mounted on the tube 22 at the side of the vane which is adjacent to the said connector.

Also mounted on the tube 22 are five terminals 26, 27, 28, 29 and 30 disposed respectively at the left-hand end of the leg A, at the junction of the legs A and B, at the junction of the legs B and C, at the junction of the legs C and D, and at the right-hand end of the leg D. The two terminals 27 and 29 constitute the alternating input terminals of the rectifier, while the two terminals 26 and 30 when connected together constitute the positive output terminal of the rectifier, and the middle terminal 28 constitutes the negative output terminal of the rectifier.

The units are spaced apart on the bolt 21 by means of spacers 31 and insulating washers 25, one such spacer and insulating washer being interposed between the vanes of each two adjacent units. The lengths of the spacers 21 are such that each of these spacers is equal to the combined lengths of the two spacers 22 which are disposed between the same two adjacent units, together with the combined thickness of the negative connector 14 of the one unit and the two positive connectors of the other unit. To maintain those units parallel between which the terminals 27, 28 and 29 are interposed, additional metal washers 32 are provided on the tube 23 at one end of the associated spacer. Also mounted on the tube 23 at each end of the stack is a spacer 24.

The parts are clamped together on the bolts by means of nuts 34 screwed onto the ends of the bolts 20 and 21, and interposed between each nut and the adjacent parts of the stack are a spring washer 35, a mounting plate 36, an insulating washer 37 provided with a metal insert and such additional metal spacer washers 38 as may be necessary to maintain the end plates in the desired parallel spaced relation with respect to the adjacent rectifier units. It will be noted that the end plates extend from one bolt to the other and are provided at their upper ends with outturned flanges. These end plates serve the dual purpose of increasing the rigidity of the stack and facilitate the mounting of the rectifier unit in a suitable housing or supporting framework.

With the rectifier stack constructed out of units embodying my invention in the manner just described, it will be apparent that each portion of the stack in both directions from the center of the stack constitutes a network of series connected units. It will also be apparent that while each leg of the rectifier as shown includes two units connected in series any desired number of units may be included in each leg merely by providing the required number of spacers and insulating washers.

One advantage of a rectifier unit construction embodying my invention is that it provides a highly efficient transfer of heat from the rectifier elements to the cooling vane.

Another advantage of a rectifier unit construction embodying my invention is that this construction makes possible both electrical and mechanical inspection prior to assembling the units into a stack.

Still another advantage of a rectifier unit construction embodying my invention is that low stack assembly pressures are required with attendant light weight construction.

A further advantage of a rectifier unit construction embodying my invention is that when the units are assembled into a stack in the manner described the main stack assembly pressure is not applied to the rectifier elements. The elements are thus free to move a limited extent against the relatively light pressure applied to them by the spring contact members 12. Damage to the elements as the result of accidental pressure to the outer edges of the cooling vanes is thus very materially minimized.

Another advantage of a rectifier unit construction embodying my invention is that when the units are assembled into a stack in the intended manner, a free circulation of air through the stack assembly is provided with an excellent transfer of heat from the outer faces of the rectifier elements and from the cooling vanes directly to the air.

Although I have herein shown and described only a few forms of rectifier units embodying my invention, it is understood that various changes and modifications may be made therein within the scope of the appended claims without departing from the spirit and scope of my invention.

Having thus described my invention, what I claim is:

1. A rectifier unit comprising a cooling vane, two rectifier elements secured to opposite sides of said vane, each said element comprising a metal plate provided on each side with a contact layer separated from the plate by a rectifying junction, a contact washer of impressionable conducting material interposed between the inner contact layer of each element and said vane, two spring contact members one clamped against the outer contact layer of each element, means connecting said two contact members together and to said vane, whereby all four contact layers of said elements are connected to said vane, and two connectors one connected to each plate, said unit constituting a single wave rectifier of which said vane constitutes one terminal and said connectors together constitute the other terminal.

2. A rectifier unit comprising a cooling vane provided with a through hole, two rectifier elements each provided with a hole which aligns with the hole in said vane and one secured to each side of said vane by a metal member passing through the holes in said elements and the hole in said vane, each said element comprising a metal plate provided on each side with a contact layer separated from the plate by a rectifying junction, a contact washer of impressionable conducting material interposed between the inner contact layer of each element and said vane and each provided with a hole which aligns with the holes in said vane and said elements, two spring contact members one clamped against the outer contact layer of each element by said metal member, means insulating said vane, said elements and said contact washers from said metal member, a first connector secured to one end of said member and adapted to contact said vane to electrically connect both outer contact layers of said element to said vane through the medium of said metal member and said spring contact members, whereby all four contact layers of said element are connected to said vane, a second connector secured to the metal plate of the one element, and a third connector secured to the metal plate of the other element.

3. A rectifier unit comprising a cooling vane provided with a plurality of through holes, two rectifier elements each provided with a through hole and each comprising a metal plate provided on each side with a contact layer separated from the plate by a rectifying junction, said elements being disposed on opposite sides of said vane and being clamped to said vane by a hollow metal rivet passing through the holes in said elements, and one of the holes in said vane, two contact washers of impressionable conducting material, one interposed between the inner contact layer of each element and said vane and each serving the triple purpose of providing good heat transfer from the associated element to said vane, establishing electrical contact between the inner contact face of the associated element and said vane, and insuring that the inner and outer edges of the plate of each element will be spaced from the vane far enough to prevent the plate from contacting the vane; two spring contact members one mounted on said rivet on each end of the rivet to establish electrical contact between the rivet and the outer contact layer of each vane, means insulating said rivet from said vane, the plates of said elements and said contact washers where said rivet passes therethrough, a first connector mounted on one end of said rivet and adapted to contact said plate opposite another of the holes in said vane and provided with a hole which aligns with said other hole in said vane, two other connectors one secured to the plate of each element and each provided with a hole which aligns with said other hole in said vane, whereby a mounting stud can be passed through said other hole in said vane and the hole in each of said connectors, said unit constituting a half wave rectifier of which the vane serves as one terminal and said other connectors jointly serve as the other terminal.

4. A rectifier unit comprising a cooling vane provided with a plurality of through holes, two rectifier elements each provided with a through hole and each comprising a metal plate provided on each side with a contact layer separated from the plate by a rectifying junction, said elements being disposed on opposite sides of said vane and being clamped to said vane by a hollow metal rivet passing through the holes in said elements and one of the holes in said vane, two contact washers of impressionable conducting material, one interposed between the inner contact layer of each element and said vane and each serving the triple purpose of providing good heat transfer from the associated element to said vane, establishing electrical contact between the inner contact face of the associated element and said vane, and insuring that the inner and outer edges of the plate of each element will be spaced from the vane far enough to prevent the plate from contacting the vane; two spring contact members one mounted on said rivet on each end of the rivet to establish electrical contact between the rivet and the outer contact layer of each vane, means insulating said rivet from said vane, the plates of said elements and said contact washers where said rivet passes therethrough, a first connector mounted on one end of said rivet and adapted to contact said plate opposite another of the holes in said vane and provided with a hole which aligns with said other hole in said vane, two other connectors one secured to the plate of each element opposite a hole in said vane, the one said connector being carried to the side of the vane opposite to the element through a contiguous hole in the vane and each said connector being spaced a predetermined distance from the vane and provided with a through hole which aligns with the hole in the other connector and said other hole in said vane, whereby a mounting stud can be passed through said other hole in said vane and the hole in each of said connectors, said unit constituting a half wave rectifier of which the vane serves as one terminal and said other connectors jointly serve as the other terminal.

LINNIE K. HEDDING.

REFERENCES CITED

The following references are of record in the file of this patent:

UNITED STATES PATENTS

| Number | Name | Date |
|---|---|---|
| 1,738,113 | Ogden | Dec. 3, 1929 |
| 2,172,200 | Hein | Sept. 5, 1939 |
| 2,221,616 | Smith | Nov. 12, 1940 |
| 2,378,411 | Kotterman | June 19, 1945 |

FOREIGN PATENTS

| Number | Country | Date |
|---|---|---|
| 163,675 | Switzerland | Nov. 1, 1933 |
| 557,062 | Great Britain | Nov. 2, 1943 |